US006172778B1

United States Patent
Reinhorn et al.

(10) Patent No.: US 6,172,778 B1
(45) Date of Patent: Jan. 9, 2001

(54) COMPACT OPTICAL CROSSBAR SWITCH

(75) Inventors: Silviu Reinhorn, Mevaseret Zion; Asher Friesem; Yaakov Amitai, both of Rehovot; Shachar Gorodeisky, Moshav Ginaton, all of (IL)

(73) Assignee: Yeda Research & Development Co. Ltd. of Weizmann Institute of Science, Rehovot (IL)

( * ) Notice: Under 35 U.S.C. 154(b), the term of this patent shall be extended for 0 days.

(21) Appl. No.: 09/355,407

(22) PCT Filed: Jan. 26, 1998

(86) PCT No.: PCT/IL98/00036

§ 371 Date: Jul. 27, 1999

§ 102(e) Date: Jul. 27, 1999

(87) PCT Pub. No.: WO98/33335

PCT Pub. Date: Jul. 30, 1998

(30) Foreign Application Priority Data

Jan. 27, 1997 (IL) .......................................... 120089

(51) Int. Cl.[7] .............................. G02B 5/32; G02B 6/28; G02B 6/32; G02B 6/34

(52) U.S. Cl. .............................. 359/15; 359/19; 359/565; 359/576; 385/12; 385/15; 385/16; 385/17; 385/24

(58) Field of Search .................................. 385/12, 15, 16, 385/17, 24; 359/15, 16, 19, 20, 565, 576

(56) References Cited

U.S. PATENT DOCUMENTS

| 4,946,253 | 8/1990 | Kostuck . | |
|---|---|---|---|
| 4,952,010 | * 8/1990 | Healey et al. | 359/11 |
| 5,040,864 | * 8/1991 | Hong | 385/16 |
| 5,515,184 | 5/1996 | Caulfield et al. . | |

FOREIGN PATENT DOCUMENTS 2 243 967   11/1991  (GB) .

OTHER PUBLICATIONS

P.C. Huang, W.E. Stephens, T.C. Banwell and L.A. Reith, "Perfomance of 4×4 optical crossbar switch utilising acousto–optic deflector", *Electronics Letters*, vol. 25 No. 4, pp. 252–253, Feb. 1989.

H. Kogelnik, "Coupled wave theory for thick hologram gratings", *Bell Systems Technical Journal*, vol. 48, pp. 2909–2947, 1969.

R. W. Cohn, "Link analysis of a deformable mirror device based optical crossbar switch", *Optical Engineering*, vol. 31, No. 1, pp. 134–140, Jan. 1992.

(List continued on next page.)

*Primary Examiner*—Jon Henry
(74) *Attorney, Agent, or Firm*—Darby & Darby

(57) ABSTRACT

A planar optical crossbar switch comprising two thin planar substrates, on each of which are recorded or attached two holographic lenses between which light propagates by means of total internal reflection. The first lens is a negative cylindrical lens, used to input the incident light signal to the substrate, and the second lens is a positive cylindrical lens. The two substrates are disposed at right angles to each other in such a way that the positive lenses are positioned one on top of the other with a spatial light modulator sandwiched between them or beneath them. A linear array of detectors collects the output signal from the negative lens on the second substrate. Light from an element in the linear array of sources is spread out, by means of the negative cylindrical holographic lens on the first substrate, across a row of the SLM, and light from a column of the SLM is focused by means of the cylindrical holographic lenses on the second substrate, onto a particular element of the linear array of output detectors. To connect a signal form the ith source in the input array to the jth detector in the output array, the value of the {i,j} pixel of the SLM matrix should be in the ON state.

22 Claims, 7 Drawing Sheets

OTHER PUBLICATIONS

I. Shariv et al., "Compact holographic beam expander", *Optics Letters,* vol. 18 No. 15, pp. 1268–1270, Aug. 1993.

M. Fukui, "Optoelectronic parallel computing system with optical image crossbar switch", *Applied Optics*, vol. 32 No. 32, pp. 6475–6481, Nov. 1993.

J. Shamir, "Fundamental limits of optical computing", *Proceedings of SPIE,* 1319, pp. 168–172, 1990.

Y. Wu, et al., "Optical crossbar elements used for switching networks", *Applied Optics,* vol. 33 No. 2, pp. 175–178, Jan. 1994.

K. H. Brenner and T. M. Merklein, "Implementation of an optical crossbar network based on directional switches", *Applied Optics,* vol. 31 No. 14, pp. 2446–2451, May 1992.

A. W. Lohmann and A. S. Marathay, "Globality and speed of optical parallel processors", *Applied Optics,* vol. 28 No. 18, pp. 3838–3842, Sep. 1989.

M. Fukui and K. Kitayama, "High–throughput optical image crossbar switch that uses a point light source array", *Optics Letters,* vol. 18 No. 5, pp. 376–378, Mar. 1993.

Y. Amitai and J. W. Goodman, "Design of substrate–mode holographic interconnects with different recording and read-out wavelengths", *Applied Optics,* vol. 30 No. 17, pp. 2376–2381, Jun. 1991.

S. H. Long et al., "Planar implementation of crossover interconnects", *Optics Letters,* vol. 17 No. 18, pp. 1253–1255, Sep. 1992.

J. W. Goodman et al., "Fully parallel, high–speed incoherent optical method for performing discrete Fourier transforms", *Optics Letters,* vol. 2 No. 1, pp. 1–3, Jan. 1978.

J. Jahns and S. J. Walker, "Imaging with planar optical systems", *Optics Communications,* vol. 76 No. 5,6, pp. 313–317, May 1990.

J. M. Finlan and K. M. Flood, "Collimation of diode laser arrays using etched cylindrical computer–generated holographic lenses", *SPIE* vol. 1052 Holographic Optics: Optically and Computer Generated, pp. 186–190, 1989.

\* cited by examiner

COMPACT OPTICAL CROSSBAR SWITCH

FIELD OF THE INVENTION

The present invention relates to the field of crossbar switching components for optical signal processing.

BACKGROUND OF THE INVENTION

Crossbar interconnection networks are essential components in a variety of optical signal processing applications, such as communication signal switching and parallel computation. Such applications are described in articles such as that by M. Fukui entitled "Optoelectronic parallel computing system with optical image crossbar switch", in Applied Optics, Vol. 32, pp 6475–6481 (1993), and that by Y. Wu, L. Liu, and Z. Wang, entitled "Optical crossbar elements used for switching networks", published in Applied Optics, Vol. 33, pp. 175–178 (1994). The disclosures of these publications, and of those mentioned in any other part of the specification, and the disclosures of all documents cited in any of the publications, are hereby incorporated by reference.

Such crossbar interconnection networks have been incorporated into optical configurations for performing dynamic vector matrix multiplication and arbitrary interconnection between N inputs and N outputs. They take advantage of the speed and the parallelism of optical signal transmission to provide performance levels significantly better than those attainable using microelectronic devices.

Several such systems, using discrete components and free space propagation, have been described in the literature, such as by J. W. Goodman, A. R. Dias, and L. M. Woody in "Fully parallel, high-speed incoherent optical method for performing discrete Fourier Transforms", published in Optics Letter, Vol. 2, pp. 1–3 (1978); by M. Fukui and K. Kitayama in "High-throughput image crossbar switch that uses a point light source array", published in Optics Letters, Vol. 18, pp. 376–378 (1993); by P. C. Huang, W. E. Stephens, T. C. Banwell and L. A. Reith in "Performance of 4×4 optical crossbar switch utilizing acousto-optic deflector" published in Electronics Letters, Vol. 25, pp. 252–253 (1989); by K. H. Brenner and T. M. Merklein in "Implementation of an optical crossbar network based on directional switches", published in Applied Optics, Vol. 31, pp. 2446–2451 (1992); and by R. W. Cohn in "Link analysis of deformable mirror device based optical crossbar switch", published in Optical Engineering, Vol. 31, pp. 134–140 (1992).

Such configurations typically consist of a number of conventional lenses and a dynamic spatial light modulator (SLM). The use of discrete optical components, and the relatively large number thereof required, results in a switch with comparatively high weight and volume. Furthermore, the individual components have to be mounted and aligned mechanically. The alignment accuracy required between individual components is extremely difficult to achieve and often impractical for the high density of channels to be switched. As a result, free space propagation optical crossbar switching systems are very sensitive and unruggedised, have relatively low positioning accuracy and are subject to thermal instability, thus making them unsuitable for general industrial use.

All of these factors combine to make such free space switches incompatible with the small size and circuit construction techniques used in the integrated optoelectronic technology used in modern signal processing and communications system. There is, therefore, need for an optical crossbar switch which combines the speed of optical processing techniques with the small dimensions typical of microelectronic technology.

The problems associated with discrete elements and free space configurations can be alleviated by using planar optics configurations, in which several optical elements (lenses, filters, beam splitters, polarisers, etc.), can be integrated onto a single substrate. The light propagates between the different optical elements, inside the substrate, either by total internal reflection or with the aid of reflective coatings on the substrate surfaces. The alignment of several optical elements integrated onto one substrate can be done with relatively high accuracy during the recording of the elements in the laboratory. Planar optical technology is fully compatible with microelectronic detectors, devices and production technology, with the element patterns being generated by standard microelectronic production techniques such as photolithography and etching.

Such planar optical systems have been developed to perform basic imaging functions, as described by J. Jahns and S. Walker in the article "Imaging with planar optical systems" in Optics Communications, Vol. 76, No. 5–6, May 1990, pp. 313–317. Specific interconnect designs for use in planar optical systems are described by Y. Amitai and J. Goodman in "Design of substrate-mode holographic interconnects with different recording and readout wavelengths", as published in Applied Optics, Vol. 30, pp. 2376–2381 (1991), and by S. H. Song, et al in "Planar optical implementation of crossover interconnects", in Optics Letters, Vol. 17, pp. 1253–1255 (1992). However, no method has been described heretowith whereby an optical crossbar switch can be implemented in planar technology.

SUMMARY OF THE INVENTION

Accordingly, it is an object of the present invention to overcome the limitations of the prior art by providing an optical crossbar switch with performance typical of conventional bulk component switches, but with a level of compactness compatible with optoelectronic circuit package sizes.

There is thus provided in accordance with a preferred embodiment of the present invention, a planar optical crossbar switch comprising two thin planar substrates made of an optical medium such as glass, on each of which is recorded or attached two holographic lenses. The light propagates inside each substrate between the two lenses by means of total internal reflection, or if the surfaces of the substrates are coated with a reflecting layer, by means of speculator reflection. The two lenses on each substrate are disposed, either on opposite sides of the substrate, or in another preferred embodiment, on the same side of the substrate, depending on the optical configuration used. The first lens is a negative cylindrical lens, used to input the incident light signal to the substrate. If this light is in the form of a linear array, it can be positioned on top of the lens. The second lens is a positive cylindrical lens.

The two substrates are disposed at right angles to each other with their positive lenses disposed one on top of the other. A two dimensional array of binary optical switches, acting as a spatial light modulator (SLM), is sandwiched between these two positive lenses, and spatially modulates the light transmission passing through it. The SLM could also be a reflective array, and control the light by reflection off its matrix elements. In this case, the mutual geometry of the two substrates is changed accordingly, to allow the light to enter the second substrate after reflection off the SLM. A linear array of detectors for collecting the output signal is disposed against the negative lens on this second substrate.

The operation of the optical planar holographic crossbar switch is similar to that of a conventional bulk crossbar switch. First, the light from a particular element in the linear array of sources is spread out, by means of the negative cylindrical holographic lens on the first substrate, across a particular row of the switching matrix array. Then, the light from all the transmitting pixels of a particular column of the matrix is focused, by means of the cylindrical holographic lenses on the second substrate, onto a particular element of the linear array of output detectors. Of course, since the definitions of rows and columns of the switching matrix are arbitrary, the geometry of the switch could equally be reversed, such that the light from an element in the source array is spread out down a column of the matrix, and the light from a row of the matrix is focused onto an element of the detector array. Any reference to a row in this specification is, therefore, construed to mean any contiguous line of elements in a matrix, regardless of its physical orientation, and any reference to a column refers to a line a elements of the matrix, orientated orthogonally to a row.

The interconnection matrix between arbitrary elements at the input array of the switch to elements of the output detector array is determined by which particular elements of the SLM matrix are ON or OFF. For example, in order to connect a signal from ith source in the input array to the jth detector in the output array, the value of the {i,j} pixel of the SLM matrix should be ON, i.e., this pixel should be in the transparent state if a transmissive SLM is being used, or in the predetermined reflective state if a reflective SLM is being used.

There is also provided in accordance with a further embodiment of the present invention, a holographic optical device including, at least one light transmissive substrate on which are disposed holographic elements, a one dimensional array of light sources, a one dimensional array of detectors, and a two dimensional spatial light modulator including rows and columns of elements, the device being characterized in that light signals can propagate from any of one or more of the light sources, by means of internal reflections inside the at least one light transmissive substrate, to any of one or more of the detectors, in accordance with the status of the spatial light modulator.

In accordance with yet another preferred embodiment of the present invention, there is provided a holographic optical device as described above, and wherein the at least one light transmissive substrate on which are disposed holographic elements, includes two light transmissive substrates on which are disposed holographic elements.

In accordance with a further preferred embodiment of the present invention, there is also provided a holographic optical device as described above, and which is operative as a crossbar switch that directs the light signals from any of the light sources to any of the detectors in accordance with the spatial light modulator status.

There is further provided in accordance with yet another preferred embodiment of the present invention, a holographic optical device as described above, and which is operative as a crossbar switch that distributes the light signals from at least one of the light sources to any several of the detectors in accordance with the spatial light modulator status.

There is still further provided in accordance with yet another preferred embodiment of the present invention, a holographic optical device as described above, and which is operative as a crossbar switch that combines the light signals from any several of the light sources to at least one of the detectors in accordance with the spatial light modulator status.

There is even further provided in accordance with a preferred embodiment of the present invention, a holographic optical device as described above, and wherein the light signals propagating from one of the light sources are caused to spread out onto the elements of a row of the spatial light modulator, and light signals from the elements of a column of the spatial light modulator are caused to converge onto one of the detectors.

In accordance with yet another preferred embodiment of the present invention, there is provided a holographic optical device as described above, and wherein at least one of the holographic elements is a cylindrical holographic lens.

In accordance with a further preferred embodiment of the present invention, there is also provided a holographic optical device as described above, and wherein the wave from any of the light sources is transformed by the first of the holographic elements to a cylindrical wave that is trapped and propagates inside the at least one substrate, the second of the holographic elements transforms the cylindrical wave into a plane wave that emerges from the at least one substrate towards the spatial light modulator, the plane wave is modulated bye the spatial light modulator, re-enters one of the at least one substrate and is transformed by means of the third of the holographic elements into a second cylindrical wave rotated by 90 degrees with respect to the first cylindrical wave, the second cylindrical wave propagates inside the substrates towards the fourth of the holographic elements, which transforms the cylindrical wave into a wave which emerges from the one of at least one substrate, and is incident onto the array of detectors.

There is further provided in accordance with yet another preferred embodiment of the present invention, a holographic optical device as described above, and wherein the first of the holographic elements is a negative holographic cylindrical lens, the second and third of the holographic elements are positive holographic cylindrical lenses and the fourth of the holographic elements is a negative holographic cylindrical lens.

There is provided in accordance with still a further preferred embodiment of the present invention, a holographic optical device as described above, and wherein at least one of the holographic elements is a holographic lenslet array or a non-spherical holographic lens.

In accordance with yet another preferred embodiment of the present invention, there is provided a holographic optical device as described above, and wherein the light transmissive substrate on which are disposed holographic elements, includes a light transparent plate and a coating of holographic recording material on which are recorded the holographic elements, or a light transparent plate on which the holographic elements are applied directly.

In accordance with still another preferred embodiment of the present invention, there is provided a holographic optical device as described above, and wherein the light transmissive substrate on which are disposed holographic elements, includes a light transparent plate to which is attached at least one additional substrate on which is disposed at least one separate holographic element.

There is further provided in accordance with yet another preferred embodiment of the present invention, a holographic optical device as described above, and wherein the two dimensional spatial light modulator is defined by a matrix array of transmissive light modulator elements, operative such that when the light from source i of the one dimensional array of light sources is to be directed to detector j of the one dimensional array of detectors, then the specific (i,j) modulator element must be transparent, whereas otherwise it is non-transparent.

There is provided in accordance with still a further preferred embodiment of the present invention, a holographic optical device as described above, and wherein the two dimensional spatial light modulator is defined by a matrix array of reflective light modulator elements, operative such that when the light from source i of the one dimensional array of light sources is to be directed to detector j of the one dimensional array of detectors, then the specific (i,j) modulator element must be reflective, whereas otherwise it is non-reflective.

Furthermore, in accordance with yet another preferred embodiment of the present invention, there is provided a holographic optical device as described above, and wherein the two dimensional spatial light modulator is defined by a matrix array of reflective light modulator elements, operative such that when the light from source i of the one dimensional array of light sources is to be directed to detector j of the one dimensional array of detectors, then the specific (i,j) modulator element must be in such a state as to reflect the light in a direction that will cause it to be diffracted by one of the holographic elements to the detector j, whereas otherwise it will reflect the light to another direction.

In accordance with yet another preferred embodiment of the present invention, there is provided a holographic optical device as described above, and wherein at least one of the light sources is the exit aperture of an optical fiber.

In accordance with a further preferred embodiment of the present invention, there is also provided a holographic optical device as described above, and wherein at least one of the detectors is the entrance aperture of an optical fiber.

BRIEF DESCRIPTION OF THE DRAWINGS

The present invention will be understood and appreciated more fully from the following detailed description, taken in conjunction with the drawings, in which:

FIG. 3A is an off-axis unfolded schematic diagram showing the geometry for recording of both the positive and negative cylindrical holographic lenses in one set-up. FIG. 3B shows an actual experimental arrangement for executing the recording.

FIG. 7A shows the desired transformation routing between the input and output ports. FIG. 7B shows a two-dimensional matrix used to perform such a transformation.

DETAILED DESCRIPTION OF PREFERRED EMBODIMENTS

Figure 1A:
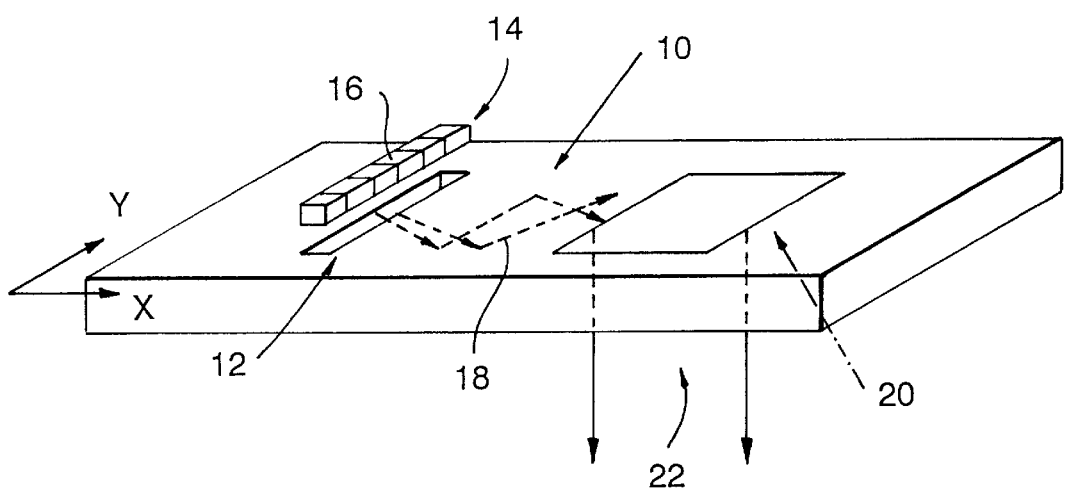
FIG. 1A and FIG. 1B are schematic views of the input and output substrates respectively of a planar optical crossbar switch, constructed and operated according to a preferred embodiment of the present invention.

Reference is now made to FIG. 1A, which shows the input substrate of a planar optical crossbar switch, constructed and operated according to a preferred embodiment of the present invention. The substrate 10 is constructed of a transparent optical medium such as glass. A negative holographic cylindrical lens HL1(−) 12 is recorded onto the substrate, or attached thereto, and a linear array 14 of light emitting sources 16, such as light emitting diodes (LED's), is disposed above this lens, such that the light from each source in the array is coupled into the substrate by the lens. Once inside the substrate, the light is trapped by total internal reflection 18, or if the surfaces of the substrate are coated with a reflecting layer, by means of speculator reflection. A second holographic lens HL1(+) 20, in this case a positive cylindrical lens, is recorded on the substrate, or affixed to it at a point distant from the first lens, such that the light fanning out from HL1(−) is collimated by HL1(+) and coupled out of the substrate 22. HL1(+) can be disposed on the same side of the substrates as HL1(−), or on the opposite side.

Figure 1B:
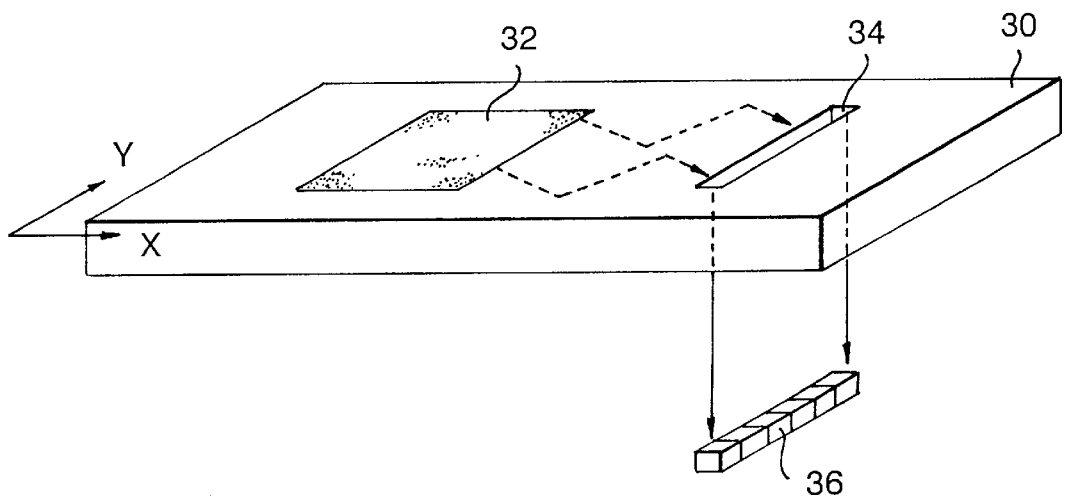

FIG. 1B shows the output substrate 30 of the planar optical crossbar switch of the present invention. The construction of this substrate is identical to that of the input substrate, in that it has a positive holographic cylindrical lens HL2(+) 32 at one position of its surface, and a negative holographic cylindrical lens HL2(−) 34 at another. In this second substrate, however, the direction of propagation of the light is opposite, i.e. from HL2(+) to HL2(−). Furthermore, at the output of HL2(−), a linear detector array 36 is disposed, operative to detect the light collected by HL2(−). In FIG. 1A, this detector is drawn at a distance from HL2(−), but it can preferably also be disposed close to or in contact with the substrate.

In effect, each of the planar substrates is configured to operate as a cylindrical Galilean telescope, for expanding (or converging) a one-dimensional beam. A planar beam expander has been described by I. Shariv, Y. Amitai and A. A. Friesem, in the article "Compact holographic beam expander", published in Optics Letters, Vol. 18, pp.

1268–1270 (1993). However, the configuration described by Shariv et al. incorporates spherical holographic lenses, the first of which is operative to convert a two dimensional incident plane wave into an off-axis diverging spherical wave, and the second of which converts this spherical wave back into a magnified plane wave. The configuration of the present invention, on the other hand, incorporates cylindrical holographic lenses, the first of which is operative to convert a one dimensional (linear) incident plane wave into an off-axis diverging cylindrical wave, and the second of which converts this cylindrical wave back into a linear wave.

Figure 2A:
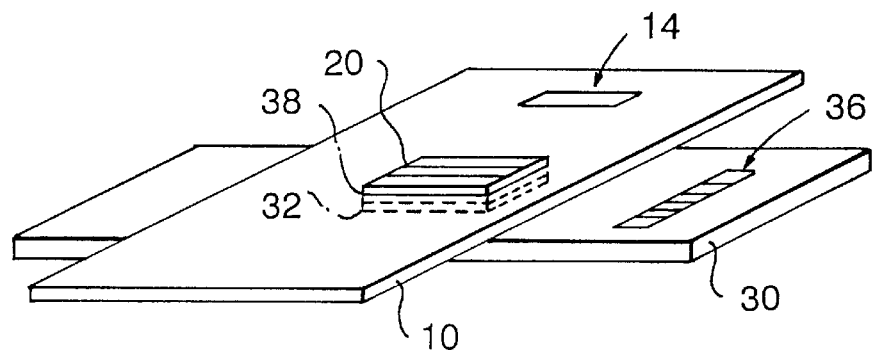
FIG. 2A shows a preferred embodiment of a complete planar optical crossbar switch, formed by combining the two substrates shown in FIGS. 1A and 1B with a transmissive spatial light modulator disposed between them.

FIG. 2A shows a complete planar optical crossbar switch, according to a preferred embodiment of the present invention, formed by combining two substrates as shown in FIGS. 1A and 1B. The substrates 10, 30, are aligned at right angles to each other, with their respective positive holographic lenses 20, 32, one on top of the other, but rotated 90 degrees to each other. A thin planar pixelated spatial light modulator 38, such as a ferroelectric liquid crystal device is disposed between them. The interposed SLM and substrates can be attached together into one rugged unit, so as to effectively form one continuous substrate assembly. The crossbar switch function is realized by configuring the lenses such that on the input substrate 10, the light from a particular element of the linear source array 14 is spread out across a particular row of the SLM matrix, while on the output substrate 30, since it is rotated to be at right angles to the input substrate, the lenses are operative to converge the light from a particular column of the SLM matrix onto a particular element of the linear output detector array 36.

The light that is transmitted through each column of the SLM is summed at its appropriate detector element. The interconnection between arbitrary elements of the input array to those of the output detector array is determined by which particular elements of the SLM matrix are ON (transparent) or OFF (opaque). For example, when a signal from the ith source in the input array is to be connected to the jth detector in the output array, the value of the {i,j} pixel of the SLM matrix should be ON, i.e. this pixel should be in the transparent state. Dynamic routing of multiple signals is achieved by switching the matrix elements of the SLM in the appropriate manner. Furthermore, other one dimensional interconnection schemes, such as one to one, one to N (broadcasting or distributing) and N to one (combining) can be readily realized by appropriate control of the SLM pixel transmission program.

Figure 2B:
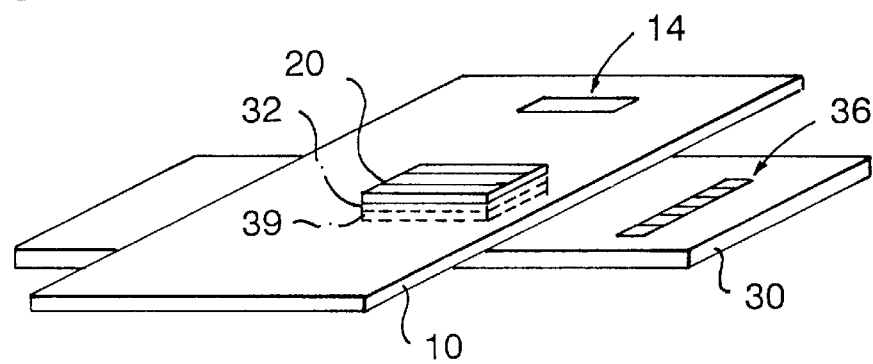
FIG. 2B illustrates a similar planar optical crossbar switch, but using a reflective SLM instead of the transmissive SLM as shown in FIG. 2A.
Figure 2C:
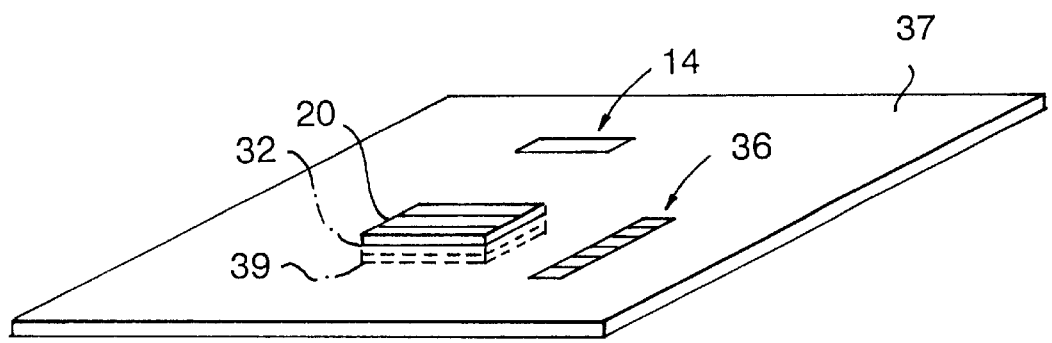
FIG. 2C illustrates a reflective SLM crossbar switch, like that shown in FIG. 2B, but constructed with all of its holographic lenses on a single substrate.

In accordance with another preferred embodiment of the present invention, the SLM could alternatively be a reflective array, such as a deformable mirror device (DMD), or a reflective liquid crystal array, or a resonant grating waveguide structure array, which controls the light by turning its reflective matrix elements on and off. A reflective embodiment employing a DMD array as the SLM, is illustrated in FIG. 2B. This embodiment looks similar to the transmissive SLM embodiment shown in FIG. 2A except that the mutual geometry of the two substrates and the SLM are changed, such that the SLM is located below both substrates instead of between them. The light from the positive holographic cylindrical lenses HL1(+) 20 on the input substrate is reflected back off the DMD SLM 39, into the positive holographic cylindrical lenses HL2(+) 32 on the output substrate, which is located on the same side of the SLM as the first substrate. FIG. 2C illustrates an embodiment of the present invention incorporating a reflective SLM, in which all of the holographic lenses are recorded on a single substrate 37 using both sides of the substrate, and the reflective SLM 39 attached to the underside of the substrate 38 beneath the two mutually positioned positive holographic lenses, HL1(+) 20 and HL2(+) 32, thereby effectively implementing the switch on one continuous substrate.

In order to ensure that the light emerging from HL1(+) is not diffracted on its passage through lens HL2(+) towards the DMD SLM, it is necessary to record the two lenses HL1(+) and HL2(+) with slightly different Bragg conditions, such that light which fulfills the Bragg condition for HL1(+) for instance, and will therefore be diffracted by HL1(+) in a specific direction, will not fulfill the Bragg conditions for diffraction by HL2(+), and so will pass therethrough undiffracted. The DMD SLM operates so that when a certain matrix elements is ON, the direction of the reflected light is made such that it will be diffracted by HL2(+) into the output substrate, whereas when the element is OFF, the small angular movement of that mirror element redirects the reflected light to an angle such that the light is not diffracted by HL2(+) into the output substrate. In this way, the reflective SLM array is operative to cause the desired interconnection between input light from a specific light source or sources to the desired detector or detectors.

the following sections of this specification, including descriptions of the conditions for effective operation of the planar crossbar switch, and of the results obtained from a planar crossbar switch constructed in accordance with the present invention, were all based on the transmissive SLM embodiment, though it is to be understood that the discussion is equally applicable to the case of the reflective SLM.

Furthermore, throughout this specification, the various embodiments of this invention are described using holographic elements recorded by means of Bragg interference recording into the volume of sensitive material coated on the surface of the substrates. It is to be understood that the invention can also be constructed using other forms of holographic elements, such as surface relief gratings, computer generated holograms, lithographically etched elements, direct e-beam written holograms, cast, embossed or micro-machined elements, or holographic elements produced by an other available technology.

In order to ensure proper functioning of the cylindrical telescopes that constitute the input and output substrates of the crossbar switch, the light must propagate properly between the holographic lenses and undesired interactions between any internally reflected rays and the holographic lenses must be minimized. In order to achieve this, certain geometrical and diffraction efficiency conditions must be imposed. This involves proper choice of the dimensions and the locations of the holographic lenses, the thickness and refractive index of the substrate, and the thickness and phase modulation of the recording material.

Figure 3A:
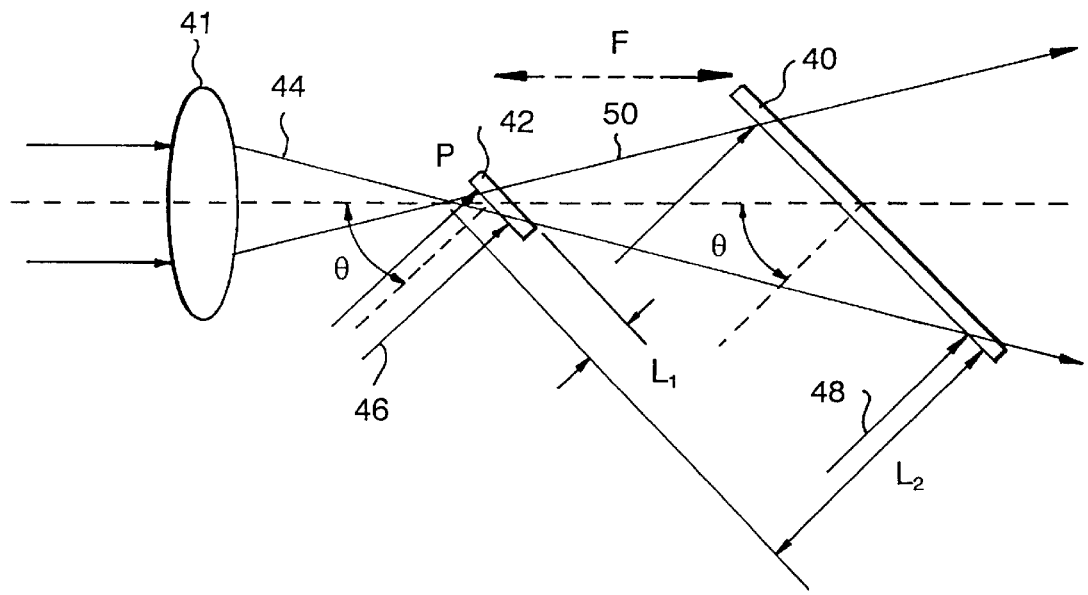
FIG. 3A and FIG. 3B illustrate a preferred method for recording the holographic lenses on the input and output substrates.
Figure 3B:
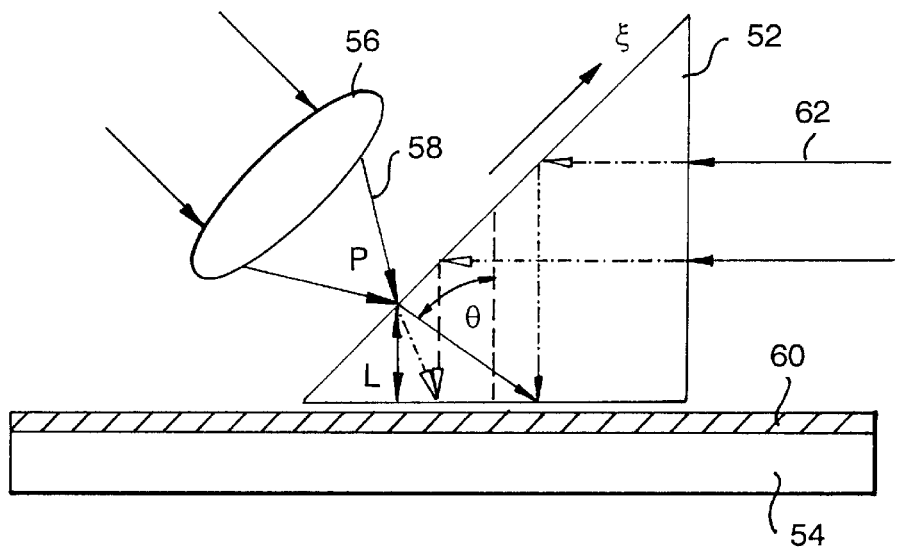

The distances between the holographic lenses are set during the recording stage, where accurate alignment can be readily achieve. The geometry of a preferred method for recording the lenses on the substrates is schematically presented in FIGS. 3A and 3B. FIG. 3A is an off-axis unfolded schematic diagram for explaining how the recording of both the positive and negative cylindrical holographic lenses is performed simultaneously in one optical set-up, while FIG. 3B shows an actual experimental set-up for executing the recording.

In FIG. 3A, the "object" wave for the negative cylindrical lens 42 is produced by focusing a plane incident wave to a point P by means of a conventional refractive cylindrical lens 41. The "object" wave for the negative cylindrical lens 42 is thus an off-axis cylindrical wave 44 emanating from P, and the "reference" beam is an on-axis plane wave 46. The "object" wave for the positive cylindrical lens 40, on the other hand, is an on-axis plane wave 48 and the "reference" beam is the off-axis cylindrical wave 50 emanating from the same location P. This recording method, whereby the same cylindrical wave is used as the object wave for HL(−) and the reference wave for HL(+) is convenient, time-saving and provides high positioning accuracy of the lenses. But even more important, it ensures the geometrical aberrations between the two lenses are completely eliminated.

In operation of the switch, the input elements set against HL1(−) of the first telescope, are illuminated with a plane wave which propagates to the positive lens HL1(+). The output from HL1(+) is thus a plane wave expanded in one dimension. After passing through the SLM, the light impinges on HL2(+) from the opposite direction with respect to the plane wave that was used to record it, i.e., with a wave that is the complex conjugate of the recording "object" wave. As mentioned previously, this effectively eliminates geometrical aberrations in the lenses.

In order to record the holographic lenses for the planar configuration, it is necessary to ensure that the off-axis angle θ for the chief ray of the object beam, inside the substrate, is sufficiently large that the entire cylindrical wave will be trapped inside the substrate by total internal reflection, i.e., $\theta < \sin^{-1}(1/n)$, with n the refractive index of the substrate. FIG. 3B illustrates a preferable method whereby this can be done using a right angle prism 52 having the same refractive index as the substrate 54. In order to minimize the aberrations that usually occur when a non-planar wavefront propagates between two media of different refractive indices, the conventional refractive cylindrical lens 56 used to focus the cylindrical recording beam 58 is positioned such that the cylindrical wavefront is focused right on the front surface of the prism, at the point P. Inside the prism, the cylindrical wavefront diverges from this surface, and impinges on the holographic recording medium 60 attached to an opposite surface with an index matching oil.

The plane wave reference beam 62 enters the prism from an adjacent face, undergoes a 90 degree total internal reflection inside the prism, so that it is perpendicularly incident on the recording medium. The interference pattern between the two waves is recorded, to produce the desired holographic lens.

The second, laterally displaced holographic lens is recorded on the same plate using the same set-up. In order to set the desired distance between the two holographic lenses on each substrate, i.e., $L_2-L_1$ as denoted in FIG. 3A, two conditions must be fulfilled:

$$\Delta L = L_2 - L_1 = (2k-1)T \qquad (1)$$

and $$\Delta L = F\cos\theta \qquad (2)$$

where 2k is an integer number denoting the number of internal reflections during the propagation of the light in the substrate, T is the thickness of substrate and F is the distance that a central ray propagates from HL(−) to HL(+). The distance F can be accurately set by translating the prism and its attached recording plate along the ξ axis. The translation can be preferably performed with a stepper motor. In this way, the location on the prism face of the point P, the focal point of the refractive cylindrical lens 56, and consequently the distance ΔL, can be accurately controlled.

Figure 4:
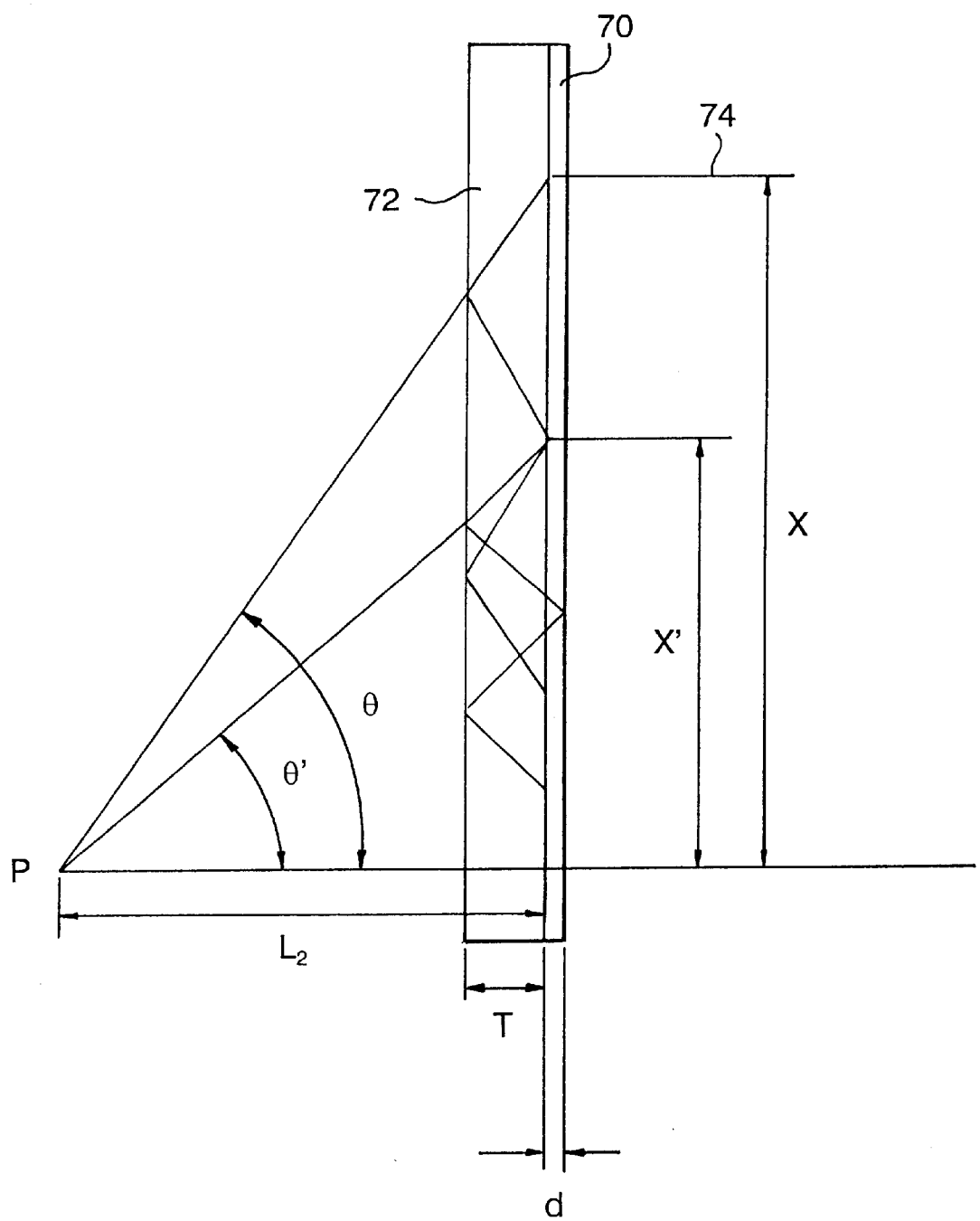
FIG. 4 illustrates the conditions necessary for obtaining high diffraction efficiencies in the holographic lenses, by analyzing the geometry for satisfying the Bragg condition for the internal propagating rays in them.

The conditions for obtaining high diffraction efficiencies are now considered, as explained by I. Shariv et al. in op. cit. These conditions are particularly relevant for the larger positive holographic lens. The geometry for the positive holographic lens and the internal propagating rays is schematically shown in FIG. 4. This figure depicts a phase diffraction grating 70 of thickness d, deposited onto a substrate 72 of thickness T. The grating diffracts all normally incident rays towards an imaginary common focal point P at a distance $L_2$ from the recording material. Alternatively, it could diffract the rays emanating from the common point P so as to obtain a plane wave. Λ and Λ' are defined as the local distances between adjacent fringes at locations x and x' respectively. Now, a ray 74 that is diffracted at x by an angle $\theta_B$, satisfying the Bragg condition, must not be diffracted a x' or at any other distance after undergoing internal reflection. Specifically, $\theta_B$ must differ sufficiently from the Bragg angle $\theta_B'$ at the other x' locations. This is achieved when $\theta_B'-\theta_B$ is greater than the angular Bragg discrimination interval $\Delta\theta_B$ of the local grating, beyond which no significant diffraction occurs.

The angular discrimination interval at x for a slanted grating, as shown by H. Kogelnik in the article "Coupled wave theory for thick holographic gratings" published in Bell Systems Technical Journal, Vol. 48, pp. 2909–2947 (1969), can be approximated by:

$$\Delta\theta_B = \frac{3}{2}\frac{\Lambda}{d\sin(\varphi-\theta)} \qquad (3)$$

where θ is the angle of incidence and Φ is the slant angle of the grating vector, which is perpendicular to the fringes at location x. Now, Λ at x can be found from the diffraction relation:

$$2\Lambda\sin\left(\frac{\theta_B}{2}\right) = \frac{\lambda}{n} \qquad (4)$$

where λ is the vacuum wavelength of the light used. The slant angle Φ at x can be found using the Bragg condition shown by H. Kogelnik in op. cit.:

$$\cos(\varphi-\theta_B) = \frac{\lambda}{2n\Lambda} \qquad (5)$$

By substituting Λ from Equation (4) and Φ from Equation (5) into Equation (3) and using the relations $\tan\theta_B=x/L_2$ and $x'=x(1-2T/L_2)$, the angular discrimination $\Delta\theta_B$ as a function of x is obtained. For any x within the lens area, the value of $\Delta\theta_B$ must be kept significantly smaller than the difference $\theta_B'-\theta_B$. This angular difference can be written as $$\theta_B'-\theta_B = \tan^{-1}(x/L_2) - \tan^{-1}(x[1-2t/L_2]/L_2) \qquad (6)$$

Figure 5:
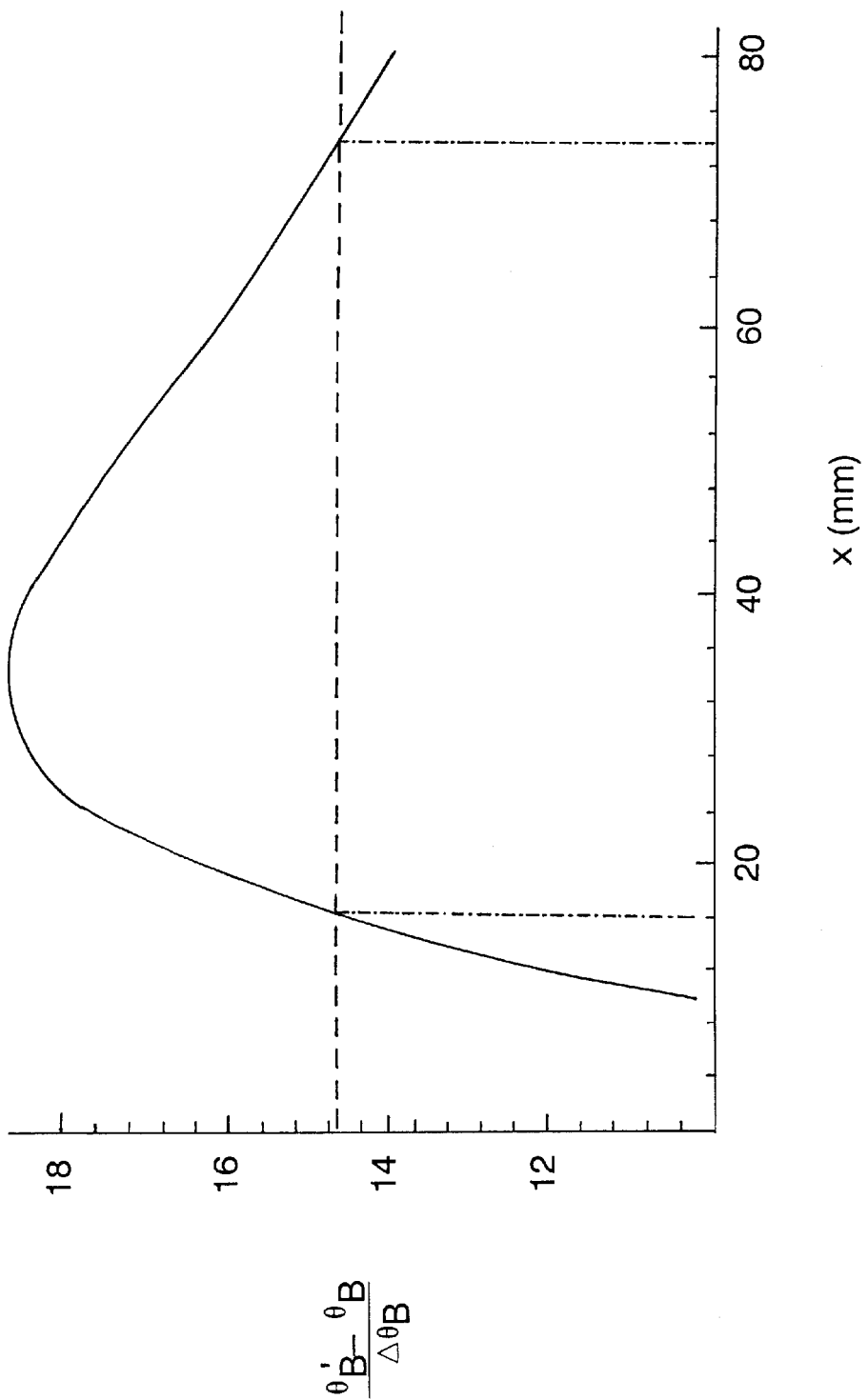
FIG. 5 is a graph showing the value of the ratio $(\theta_B'-\theta_B)/\Delta\theta_B$ as a function of x, used to determine the relative locations and size of positive holographic lenses for which undesired diffraction effects will be avoided. In this derivation, $\theta_B$ and $\theta_B'$ are the Bragg angles for rays incident on the holographic diffraction grating at positions x and x', where an incident ray just Bragg diffracted at x is totally internally reflected at x', and $\Delta\theta_B$ is the Bragg angular discrimination interval of the grating.

To determine the relative locations and size of the positive holographic lenses, for which undesired diffraction effects will be avoided, the ratio $(\theta_B'-\theta_B)/\Delta\theta_B$ as a function of x is calculated, using the parameters λ=0.5145 μm, n=1.51, T=3.2 mm, d=10 μm and $L_2$=23 mm. The results are presented in FIG. 5. Since a value for the ratio $(\theta_B'-\theta_B)/\Delta\theta_B \geq 15$ is sufficient for avoiding undesired diffraction effects, these results indicate that the positive holographic lenses can be located in the range from x=17 mm to x=75 mm. However, this range must be reduced in accordance with the requirements for total internal reflection of $\theta > \sin^{-1}(1/n)$, so that x ranges from x=21 mm to x=75 mm.

Figure 6:
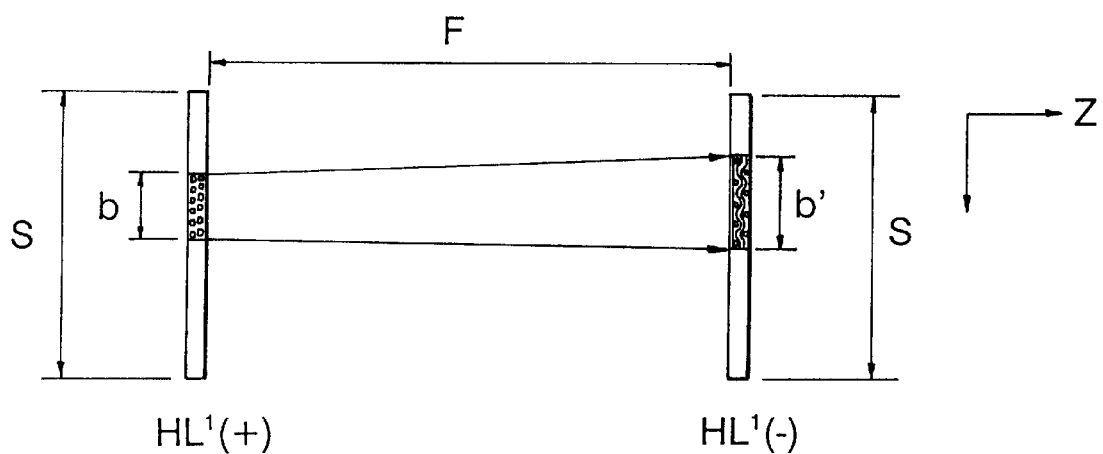
FIG. 6 schematically depicts the cross section of a cylindrical telescope with two holographic lenses, used as the basis for calculating the value of $M_{max}$, the maximum number of elements that can be interconnected with a planar crossbar switch constructed with such cylindrical telescopes.

Reference is now made to FIG. 6 which schematically depicts the cross section in the y-z plane of a single cylindrical telescope with two holographic lenses HL1(+) and HL1(−). The lenses have been unfolded from their planar positions on the substrate, in order to illustrate the geometry of the calculation more clearly. This figure is now used in order to calculate the value of $M_{max}$, the maximum number of elements that can be interconnected with the crossbar switch. The calculation is approximate, since numbers of the order of unity have been set unity. $M_{max}$ is limited by diffraction of the light from each element in the y direction. The diffraction in the x direction is negligible since in that direction, the optical power of the cylindrical lens is dominant. If the size of each element is denoted by b, and the length of the entire array of elements by S, then S=mb, where m is the number of elements in the array. The light from each element diverges in the y-direction, and after traversing a distance F in the substrate, the projected size of each element increases by diffraction to b', given by:

$$b' = 2\lambda (F/b) \tag{7}$$

The maximum useable number of elements in the switch is achieved at the limit when the light from each element of the input array illuminates only a single row of the SLM, and not adjacent row. This implies that b'≈b, so that from Equation (7), the approximation can be made that:

$$b^2 = 2\lambda F \tag{8}$$

Thus, the maximal number of elements $M_{max}$, that can be interconnected is given by:

$$M_{max,} = \sqrt{\frac{S}{2\lambda F^{\#}}} \tag{9}$$

where F# is the characteristic F number of the planar telescope configuration, i.e., F#=F/S. For example, for S=1 cm, λ=1 μm and F#=3, the maximal number of elements that can be interconnected is $M_{max}$≈40.

The result derived in Equation (9) indicates that the planar configuration of an optical crossbar switch described hereinabove does behave as a space variant system, as defined by J. Shamir, in the article "Fundamental limits of optical computing", in Proceedings of the SPIE. 1319, pp. 168–172 (1990), and as described by A. W. Lohmann and A. S. Marathay in the article "Globality and speed of optical parallel processors", published in Applied Optics, Vol. 28, pp. 3838–3842 (1989).

The operation of the above embodiment of the present invention has been described with the assumption that the incident signal is a planar wavefront, and for this reason, a single holographic cylindrical lens HL1(−) could be used for the whole of the input signal. In practice, the optical input from an array of light emitting diodes or diode lasers, as generally used for such an application, has a non-planar wavefront. In this case, HL1(−) should be a lenslet array rather than a single lens. The array incorporates a negative holographic cylindrical lenslet for each separate input array element, such that the light from each element is transformed to a diverging cylindrical wavefront inside the substrate. In the same way, it is also possible to replace HL2(−) with a holographic lenslet array, so that the light that is coupled out from the second telescope, rather than propagating to the detector array as a plane wave, is focused as a converging wave onto each individual element of the detector array. In this case, each lenslet does not have to by cylindrical, which would result in a plane output wave, but could be of any suitable geometry, spherical or non-spherical, which focuses the cylindrical wave originating from each column of the SLM after passage through HL2 (+), into a convergent wave focused onto its relevant detector element. In the same way, the output detector imaging lens HL2(−), could also be a single holographic element, of a non-spherical form, suitable for performing this function.

Furthermore, when the operating wavelength differs from that used to record the holographic lenses, it is necessary to resort to recursive design and recording methods, such as those described by Y. Amitai and J. Goodman in "Design of substrate mode holographic interconnects with different recording and readout wavelengths", published in Applied Optics, Vol. 30, pp. 2376–2381 (1991), in order to compensate for inherent chromatic aberrations and diffraction efficiency changes. Such a situation arises when the required operating wavelength is in the near infra-red, where no holographic recording materials are available.

The performance capabilities of a planar optical crossbar switch, constructed and operative according to a preferred embodiment of the present invention, can be demonstrated, using two identical substrates with holographic cylindrical lenses recorded according to the setup shown in FIG. 3B. For the recording, the values used are: λ=514.5 nm (an Argon laser), F=34.8 mm, T=3.2 mm and θ=50°, corresponding to x=27 mm on the graph in FIG. 5. The value of (2k−1) according to equations (1) and (2) is then about 7, meaning that about 6 internal reflections take place during propagation of the signals down the substrate. The holographic lenses on the top and the bottom surfaces of the glass substrates, are recorded on DuPont HRF-600 10 photopolymer supplied by the DuPont Chemical Company of Wilmington, Del.

Figure 7A:
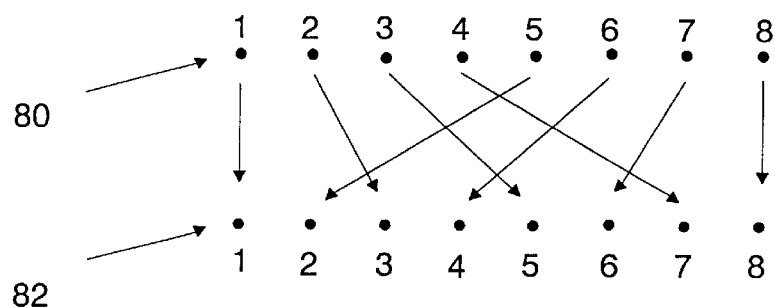
FIG. 7A and 7B illustrate the optical operation of the crossbar switch in performing a perfect shuffle transformation.
Figure 7B:
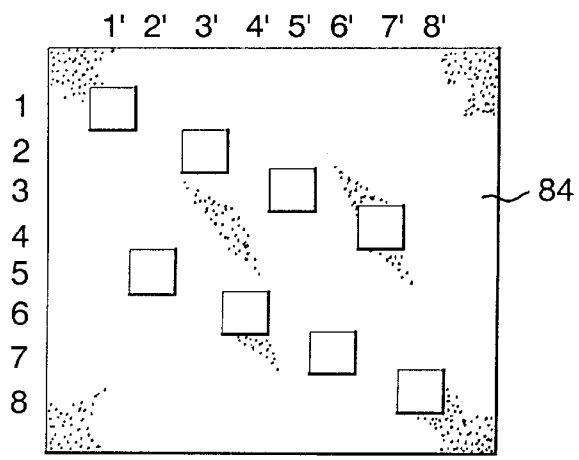

The optical operation of the crossbar switch is demonstrated by performing a perfect shuffle transformation. The arrows in FIG. 7A show the desired transformation routing between the input ports 80 on the top row, and the output ports 82 on the bottom row. FIG. 7B shows the 8×8 two-dimensional matrix 84 used to perform such a transformation, with the rows, corresponding to the input signal elements, labeled 1 to 8, and the columns, corresponding to the output signal elements, labeled 1' to 8'. The matrix element size is 800 μm×800 μm. The optical input is from a one dimensional input array of 8 elements. In setting up the switch, it is necessary to align the input and output planar cylindrical telescopes accurately with respect to each other. This is done by illuminating all the input elements with a plane wave, and monitoring the output elements with a CCD camera. The relative position of one of the telescopes is aligned, for instance by means of two perpendicular translation stages, until the optimum transmitted image of the SLM is obtained. A similar procedure is used for aligning the matrix correctly with respect to the two telescopes.

Figure 8:
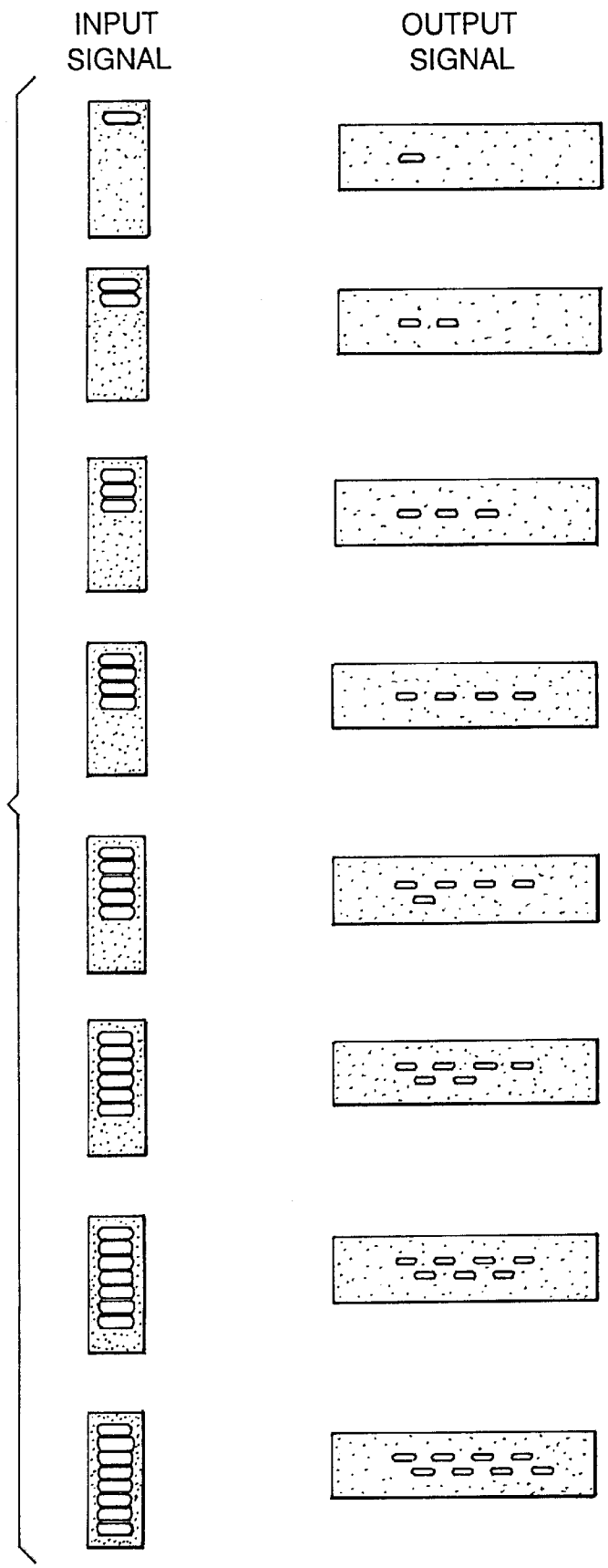
FIG. 8 shows input pattern used and the output pattern obtained during the execution of a perfect shuffle transformation by a planar optical crossbar switch constructed according to the present invention.

To demonstrate the switch operation, the input elements are illuminated sequentially and additively, and the SLM maintained in the static state shown in FIG. 7B. The output signal from the second telescope is detected with a CCD camera, and viewed on a monitor. FIG. 8 shows the input and output patterns obtained. As is evident, the light from each input element is directed to its correct position at the output, in accordance with a perfect shuffle transformation. Thus, for instance, the light from input 1 is spread across row 1, and after passage through the SLM, is transmitted for output only in column 1'. Similarly, the light from input 2 is spread across row 2, and after passage through the SLM, that signal is outputted from column 3'. Input 3 is connected to output 5', and so on.

The right downward slant of the light spots of the output is an artifact of the recording arrangement, and is due to the fact that HL2(−) is not located exactly at the focal plane of HL2(+), but rather in front of it, as shown in FIG. 3A. Consequently, the heights of the spots at the output shift slightly as a function of input row number of the SLM. This explains why the outputs 2', 4', 6' and 8' appear offset from outputs 1', 3', 5' and 7'. This is not a true offset but the continuation, through input rows 5 to 8, of the downward slant of the outputs from inputs 1 to 4. If an alternative method of recording the lenses were used, such as recording the lenses separately, with correctly adjusted focal distance, this slant effect would not be present, and all the outputs would be colinear. Alternatively, the advantages of a single recording set-up can still be used if a lenslet array is recorded instead of a single holographic lens, since in this case, the focal distance of every lenslet to the detector can be made exact.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A planar optical crossbar switch, comprising:
   first (10) and second (30) light transmissive substrates, through which light propagates by means of internal reflection;
   a one dimensional array of light sources (14), disposed on said first substrate;
   a one dimensional array of detectors (36), disposed on said second substrate;
   a first holographic element (12) disposed on said first substrate, which diffracts a light signal from at least one of said light sources into a first substantially cylindrical diverging wave (18) which is trapped and propagates inside said first substrate;
   a second holographic element (20) disposed on said first substrate, laterally of said first holographic element, which diffracts said first substantially cylindrical wave into a substantially plane wave (22) which emerges from said first substrate;
   a two dimensional spatial light modulator (38) comprising rows and columns of elements, which directs said substantially plane wave emerging from said first substrate in accordance with the status of said spatial light modulator, said spatial light modulator being disposed opposite said second holographic element;
   a third holographic elements (32) disposed on said second substrate opposite said spatial light modulator, such that it diffracts said substantially plane wave directed by said spatial light modulator into said second substrate as a second substantially cylindrical converging wave which is trapped and propagates inside said second substrate; and
   a fourth holographic element (34) disposed on said second substrate, laterally of said third holographic element, which diffracts said second substantially cylindrical wave into a substantially plane wave which emerges from said second substrate into at least one of said detectors (36).

2. A switch according to claim 1, and wherein said spatial light modulator which directs said plane wave is transmissive or reflective.

3. A planar optical crossbar switch, comprising:
   a light transmissive substrate, through which light propagates by means of internal reflection;
   a one dimensional array of light sources, disposed on said substrate;
   a one dimensional array of detectors, disposed on said substrate laterally of said one dimensional array of light sources;
   a first holographic element disposed on said substrate, which diffracts a light signal from at least one of said light sources into a first substantially cylindrical diverging wave which is trapped and propagates inside said substrate;
   a second holographic element disposed on said substrate, laterally of said first holographic element, which diffracts said first substantially cylindrical wave into a substantially plane wave which emerges from said substrate;
   a two dimensional reflective spatial light modulator comprising rows and columns of elements, disposed opposite said second holographic element, such that said substantially plane wave emerging from said substrate is reflected back into said substrate, in accordance with the status of the elements of said spatial light modulator;
   a third holographic element disposed on said substrate and at least partially facing said second holographic element, which diffracts said substantially plane wave re-entering said second substrate into a second substantially cylindrical converging wave which is trapped and propagates inside said substrate in a direction different from that of said first substantially cylindrical wave; and
   a fourth holographic element disposed on said substrate, laterally of said third holographic element, which diffracts said second substantially cylindrical wave into a substantially plane wave which emerges from said substrate into at least one of said detectors.

4. A switch according to claim 1, and wherein said first and second holographic elements diverge said light signal from at least one of said light sources onto said elements of a row of said spatial light modulator, and said third and fourth holographic elements converge said light signals from the elements of a column of said spatial light modulator onto at least one of said detectors.

5. A switch according to claim 1, and which either distributes light signals from at least one of said light sources to any several of said detectors, or which combines light from any several of said light sources to at least one of said detectors, in accordance with the spatial light modulator status.

6. A switch according to claim 1, and wherein said two dimensional spatial light modulator is defined by a matrix array of transmissive light modulator elements, operative such that when the light from source i of the one dimensional array of light sources is to be directed to detector j of the one dimensional array of detectors, then the specific (i,j) modulator element must by transparent, whereas otherwise it is non-transparent.

7. A switch according to any of claim 1, and wherein said two dimensional spatial light modulator is defined by a matrix array of reflective light modulator elements, operative such that when the light from source i of the one dimensional array of light sources is to be directed to detector j of the one dimensional array of detectors, then the specific (i,j) modulator element must be reflective, whereas otherwise it is non-reflective.

8. A switch according to any of claim 1, and wherein said two dimensional spatial light modulator is defined by a matrix array of reflective light modulator elements, operative such that when the light from source i of the one dimensional array of light sources is to be directed to detector j of the one dimensional array of detectors, then the specific (i,j) modulator element must be in such a state as to reflect the light in a direction that will cause it to be diffracted by one of said holographic elements to said detector j, whereas otherwise it will reflect the light to another direction.

9. A switch according to claim 1, and wherein at least one of said holographic elements is a cylindrical holographic lens.

10. A switch according to claim 1, and wherein:
said first and fourth holographic elements are negative holographic cylindrical lenses; and
said second and third holographic elements are positive holographic cylindrical lenses.

11. A switch according to claim 10, and wherein said first and second holographic lenses are recorded without changing the optical recording geometry, using a single cylindrical wave which acts as the object wave for said first negative cylindrical holographic lens, and as the reference wave for said second positive holographic lens, both lenses thus being recorded without geometric aberrations.

12. A switch according to claim 10, and wherein said third and fourth holographic lenses are recorded without changing the optical recording geometry, using a single cylindrical wave which acts as the reference wave for said third positive cylindrical holographic lens and as the object wave for said fourth negative holographic lens, both lenses thus being recorded without geometric aberrations.

13. A switch according claim 1, and wherein at least one of said holographic elements is a holographic lenslet array.

14. A switch according to claim 1, and wherein at least one of said holographic elements is a non-spherical holographic lens.

15. A switch according to claim 1, and wherein said light transmissive substrate on which are disposed holographic elements, comprises a light transparent plate and a coating of holographic recording material on which are recorded said holographic elements.

16. A switch according to claim 1, and wherein said light transmissive substrate on which are disposed holographic elements, comprises a light transparent plate to which said holographic elements are applied.

17. A switch according to claim 1, and wherein said light transmissive substrate on which are disposed holographic elements, comprises a light transparent plate to which is attached at least one additional substrate on which is disposed at least one separate holographic element.

18. A switch according to claim 1, and wherein at least one of said light sources is the exit aperture of an optical fiber.

19. A switch according to claim 1, and wherein at least one of said detectors is the entrance aperture of an optical fiber.

20. An input substrate of a planar optical crossbar switch, comprising a transmissive substrate on which is disposed a first negative holographic lens which diffracts incident light from a source array into said substrate, and forms a beam diverging in one dimension, and a second positive holographic lens which collimates said beam into a plane wave, and diffracts said plane wave out of said substrate, and wherein said first and second holographic lenses are recorded without changing the optical recording geometry, using a single cylindrical wave acting as the object wave for said first negative holographic lens and as the reference wave for said second positive holographic lens, both lenses thus being recorded without geometric aberrations.

21. An output substrate of a planar optical crossbar switch, comprising a transmissive substrate on which is disposed a first positive holographic lens which diffracts plane incident light into said substrate, and forms a beam converging in one dimension, and a second negative holographic lens which collimates said beam into a plane wave, and diffracts said plane wave out of said substrate into a detector array, and wherein said first and second holographic lenses are recorded without changing the optical recording geometry, using a single cylindrical wave acting as the reference wave for said first positive holographic lens and as the object wave for said second negative holographic lens, both lenses thus being recorded without geometric aberrations.

22. A method of recording the holographic elements of a switch according to claim 1, and comprising the steps of recording said second holographic element and said third holographic element with slightly different Bragg conditions, such that light which fulfills the Bragg condition and is diffracted by said second holographic element, passes undiffracted through said third holographic element, and light which fulfills the Bragg condition and is diffracted by said third holographic element, passes undiffracted through said second holographic element.

* * * * *